(12) United States Patent  
Shoemaker, Jr.

(10) Patent No.: US 6,234,487 B1  
(45) Date of Patent: May 22, 2001

(54) CRANE GAME CLAW GAUGE

(76) Inventor: Stephen P. Shoemaker, Jr., 140 The Village #401, Redondo Beach, CA (US) 90277

( * ) Notice: Subject to any disclaimer, the term of this patent is extended or adjusted under 35 U.S.C. 154(b) by 0 days.

(21) Appl. No.: 09/264,218

(22) Filed: Mar. 5, 1999

Related U.S. Application Data (60) Provisional application No. 60/081,856, filed on Apr. 15, 1998.

(51) Int. Cl.[7] .................................................. A63F 9/00
(52) U.S. Cl. .................................. 273/447; 273/448
(58) Field of Search ..................... 273/440, 447, 273/448; 901/31, 39; 294/106, 86.4, 902

(56) References Cited

U.S. PATENT DOCUMENTS

| | | | |
|---|---|---|---|
| 1,575,149 | * 3/1926 | Craig et al. | 294/902 X |
| 2,011,574 | * 8/1935 | Fleischer | 273/447 |
| 2,021,529 | * 11/1935 | Tate | 294/902 X |
| 3,306,646 | * 2/1967 | Flora, Jr. | 294/106 X |
| 3,606,443 | * 9/1971 | Painter et al. | 294/106 |
| 4,463,635 | * 8/1984 | Hafla et al. | 294/902 X |
| 4,684,128 | * 8/1987 | Verstraeten | 273/448 |
| 4,685,673 | * 8/1987 | Verstraeten | 273/448 |
| 4,718,667 | 1/1988 | Shoemaker, Jr. | . |
| 4,778,176 | 10/1988 | Shoemaker, Jr. | . |
| 4,984,951 | * 1/1991 | Jameson | 294/106 X |
| 5,271,628 | * 12/1993 | Okada | 273/448 |
| 5,358,219 | * 10/1994 | Shenk et al. | 273/448 X |
| 5,415,417 | * 5/1995 | Reis, Jr. | 273/447 |
| 5,611,587 | * 3/1997 | Brown | 294/106 |
| 5,653,446 | * 8/1997 | Lin | 273/447 |
| 5,711,565 | * 1/1998 | Smith et al. | 294/106 X |

\* cited by examiner

Primary Examiner—Raleigh W. Chiu  
(74) Attorney, Agent, or Firm—Hickman Coleman & Hughes, LLP (57) ABSTRACT

A game apparatus allowing a player to position a pick-up device over an offered prize, to pick up the prize with the pick-up device, and to reposition the pick-up device and release the prize from the pick-up device to the player. The pick-up device includes a claw with fingers and a gauge between the fingers to facilitate more securely grasping the offered prize between the fingers. The pick-up device is connected to a movement device to facilitate player positioning of the pick-up device. The pick-up device and movement device are located within a housing above the offered prizes which are also within the housing.

26 Claims, 10 Drawing Sheets

CRANE GAME CLAW GAUGE

CROSS-REFERENCE TO RELATED APPLICATIONS

This application claims benefit of prior co-pending provisional U.S. Patent Application No. 60/081,856 filed on Apr. 15, 1998, which is incorporated herein by reference.

BACKGROUND OF THE INVENTION

1. Field of the Invention

This invention relates to arcade games, and more particularly to mechanical arcade games in which a player controls a mechanical apparatus to achieve goals in the game.

2. Background of the Related Art

Crane-type arcade games are popular amusement devices often provided in game arcades, stores, or other public places. In these types of games, physical prize objects are placed on a floor region within a closed housing and are viewable by a player through transparent glass or the like. Upon the insertion of a coin or token, the player controls a mechanical claw or other pick-up device with controls such as a joystick, buttons, or toggle switch. Typically, a claw is provided above the prize objects and the player can change the position of the claw over the prizes. The claw is lowered towards the prizes by either a controller such as a computer or the player. The claw is either automatically opened and closed when it reaches the level of the prizes or is opened and closed under the player's control, after which the closed claw is automatically elevated. The claw may or may not have grasped a prize and hold onto the prize as the claw is raised. The controller moves the claw over to a dispensing container and opens the claw, allowing the prize (if any is held) to drop into a dispensing chute and to the player.

Figure 1A:
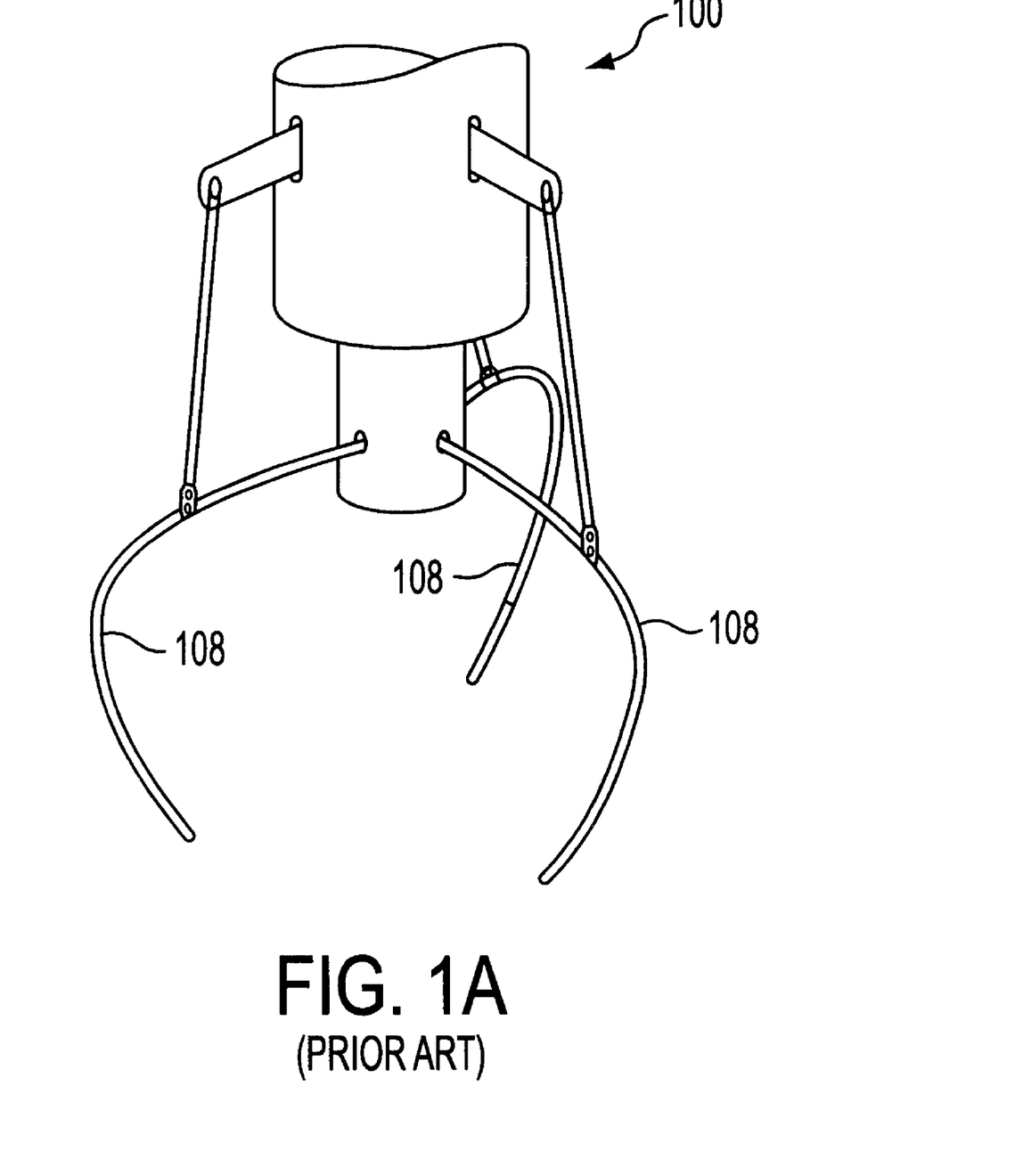
FIG. 1A depicts a prior art claw device of a game apparatus.

The claw pick-up games of the prior art have some distinct disadvantages. Typically, certain types of prizes have characteristics that make it difficult for the claw of the prior art to grasp. Examples of prior art claws can be found in U.S. Pat. Nos. 4,778,176 and 4,718,667, incorporated herein by reference. FIG. 1A depicts a prior art claw pick-up apparatus 100 having three spaced, pivotally mounted prongs or fingers 108 which are moveable between an open position shown in FIG. 1A and a closed position, shown in FIG. 1B. In the closed position of FIG. 1B, the fingers are moved together so that an object 116 between the fingers can be gripped and picked up. However, the typical orientation of claw fingers results in gaps between adjacent fingers, through which prizes may fall if the fingers close around and not on the prize, as shown by arrow 114 in FIG. 1B. For example, prizes having one or more dimensions that are smaller than the spaces between adjacent fingers when the fingers are closed, may easily fall out of the claw rather than being held and carried to the dispensing chute to the player. This particularly may be the case with prizes having a spherical or rounded shape, such as a ball, and with stuffed animals, for example. If such prizes are provided in games with claws of the prior art, players may grow tired of the game due to lack of success when the prizes continually slip out of the claw. On the other hand, to maintain player interest, operators may be required to exclude those types of prizes which may have a tendency to fall between the closed claw fingers. This may limit the types of prizes available in the game and, thus, also reduce player interest in the game.

Operators may also avoid limiting the types of prizes by using a claw having more fingers so as to decrease the distance between adjacent fingers. However, the more fingers used, the more complicated the device. Such a device is potentially more susceptible to break-down which would increase cost due to repair, and reduce revenues of the operator. Also, a closed claw or scoop may be used to pick up a prize and to avoid prizes falling out of the claw. However, such claws require more material, possibly making the device costlier than a finger-type claw, and are heavier, which may increase the wear of those parts of the game which support the claw, increasing maintenance costs and down time, and thus potentially decreasing the revenue of the operator.

SUMMARY OF INVENTION

The present invention provides a crane game apparatus and method. The apparatus described herein leads to a more precise and varied game for players. More specifically, the game apparatus of the present invention includes a claw device having a gauge for facilitating the grasping of a prize by the claw device.

In one embodiment, the claw device includes an actuating mechanism, and a plurality of fingers pivotally supported by the actuating mechanism such that the fingers can be moved between open and closed positions when the actuating mechanism is moved between first and second positions. The embodiment further includes an elongated gauge with a first end coupled to the actuating mechanism and a second end that is located within a volume defined by the fingers and between the fingers.

A method of the present invention similarly provides a game for a player to pick up and receive an offered prize, the method including providing a claw that has a plurality of fingers which define a volume between the plurality of fingers, and that has a gauge having an end located within said volume between said plurality of fingers. The method further includes positioning the claw substantially over the offered prize, lowering the claw, and closing the fingers on the offered prize to grasp it in the claw while engaging the end of the gauge with the offered prize. In addition, the method includes raising the claw and the offered prize, and opening the fingers to release the offered prize to dispense the offered prize to the player.

With the claw device of the present invention, the gauge facilitates positioning a prize relative to finger tips of the claw device, such that the prize is grasped by the finger tips instead of falling between adjacent fingers. Thus, prizes may be grasped and held with greater certainty and regularity, allowing the player to use skill in placing the claw over a desired prize. The game's objectives may therefore be achieved based on a player's skill rather than the unpredictability and reduced probability of a prior art mechanism being able to grasp all of the types of prizes available in the game.

These and other advantages of the present invention will become apparent to those skilled in the art after reading the following descriptions and studying the various figures of the drawings.

DETAILED DESCRIPTION OF THE PREFERRED EMBODIMENTS

Figure 1B:
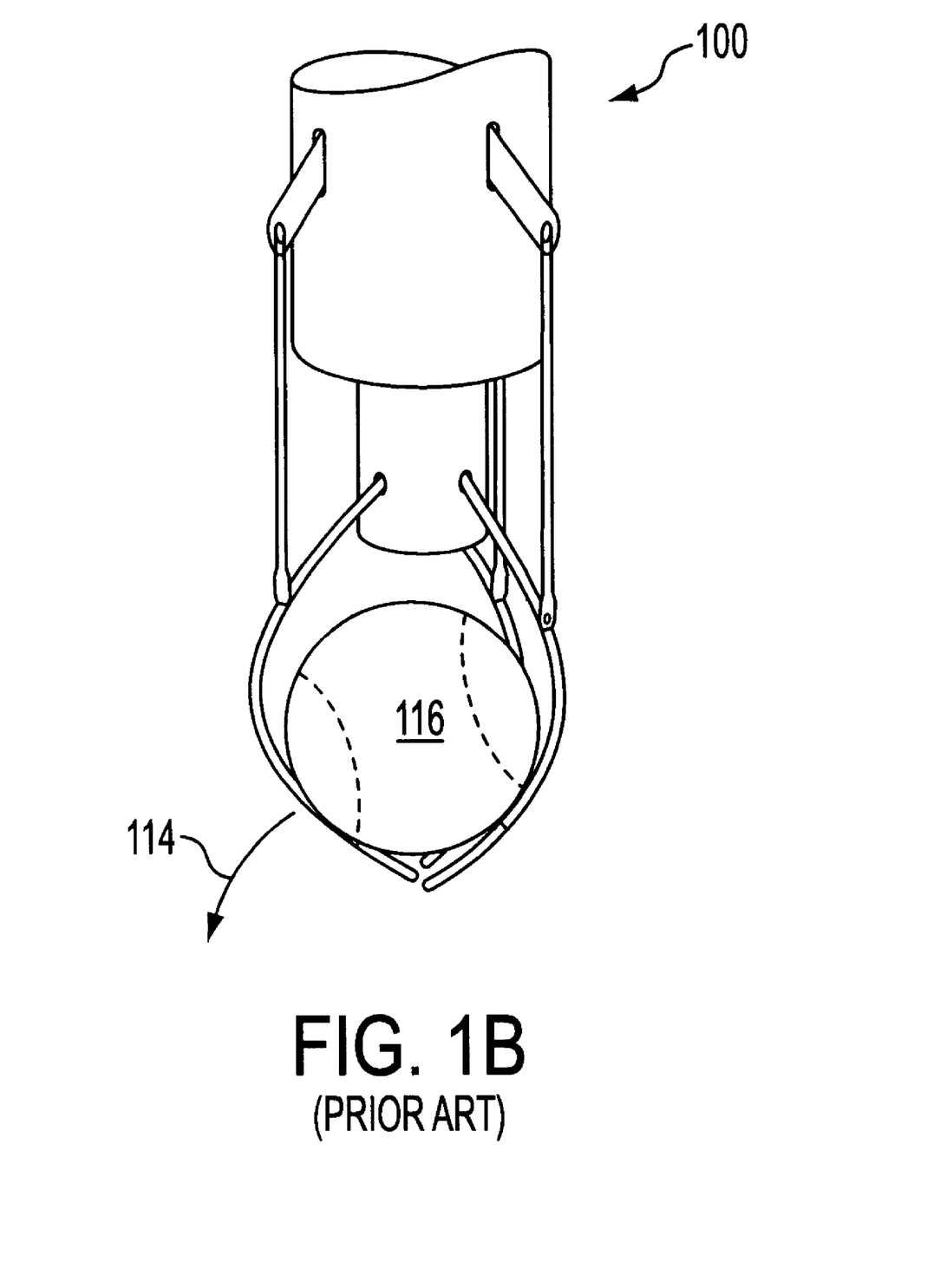
FIG. 1B depicts the prior art claw device of FIG. 1A in a closed configuration around a prize.
Figure 2A:
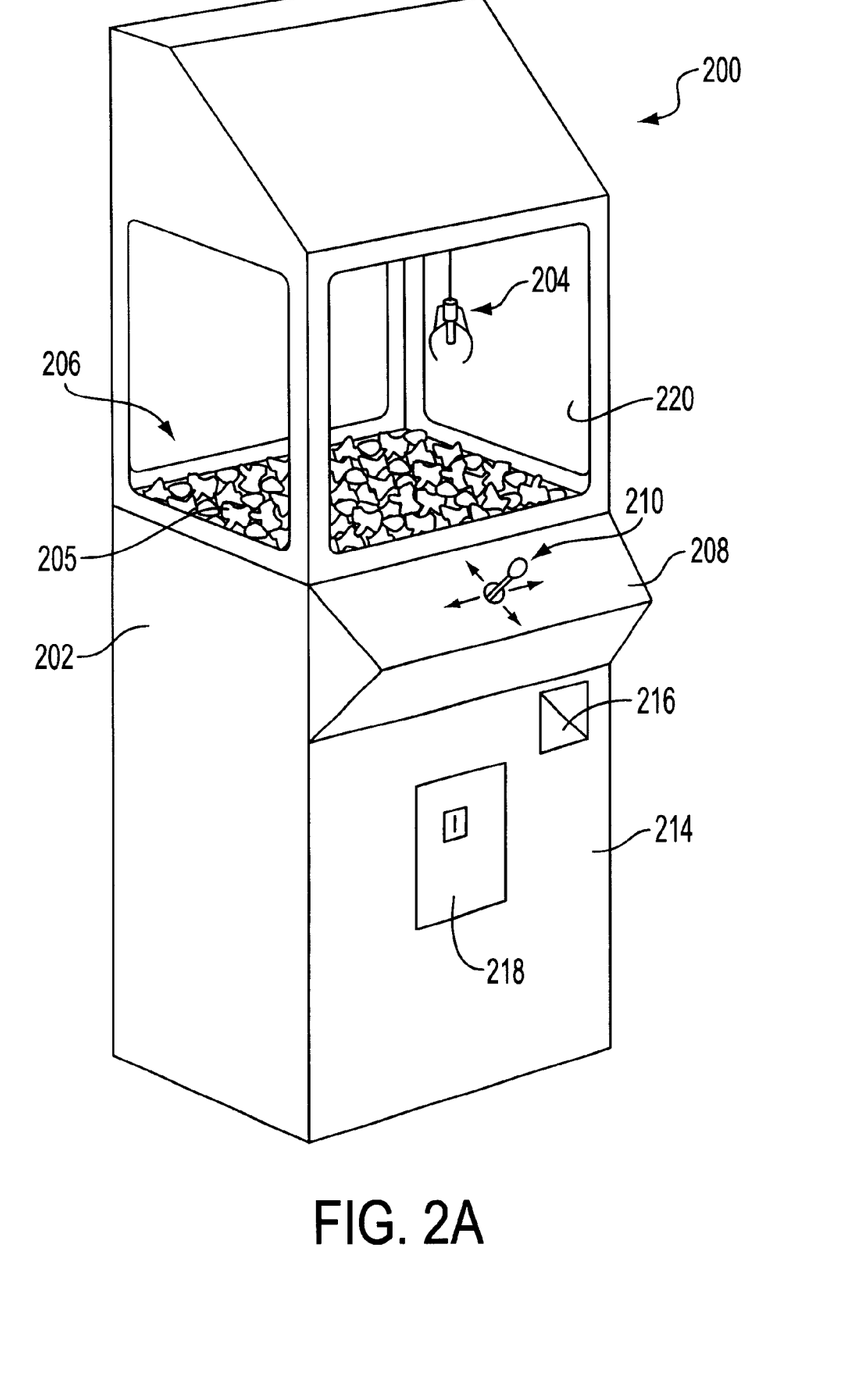
FIG. 2A is a perspective view of a game apparatus in accordance with an embodiment of the present invention.

FIGS. 1A and 1B were discussed above with reference to the prior art. FIG. 2A is a perspective view of an embodiment of a game apparatus 200 in accordance with the present invention. Game apparatus 200 includes a game housing 202, a playing area 206, a claw device (as a pick-up device) 204, a front panel 214, and player controls 210.

Game housing 202 provides a support and enclosure for the other components of the game apparatus. Housings can take a wide variety of forms; for example, as shown in FIG. 2A, game housing 202 may be of the stand-up arcade game variety in which a player stands in front of the game or sits on a stool when playing the game. In other embodiments, other types of game housings may be provided. For example, a countertop game housing, including approximately the upper half of game housing 202 shown in FIG. 2A, can be used when the game apparatus is desired to be placed on a table, counter top or other similar surface. Game housing 202 includes a transparent window or shield 220 which can prevent the player from interfering with game action. The other portions of game housing 202 which surround playing area 206 may likewise be transparent (as shown) or alternatively opaque.

Front panel 214 can be positioned below, as shown in FIG. 2A, and/or above the player controls 210 and playing area 206. The front panel can also be positioned in a wide variety of other locations on game housing 202. Front panel 214 includes a coin deposit slot 218 and prize dispenser 216.

Coin deposit slot 218 typically accepts standard currency coins, game tokens, or bills that are often available in an arcade environment. In some embodiments, other types of monetary input may also be provided, such as a credit card, debit card, etc. A coin deposited in coin deposit slot 218 starts a game. Dispenser 216 is used to dispense prizes to the player which have been won by the player from playing the game. For example, a prize can be directly dispensed to the player from dispenser 216, such as stuffed animals, balls, boxes, cubes, eggshell containers including a prize, or other objects. As another example, a prize picked up by the claw device of the present invention can be assigned a score or point value, and a proportionate number of tickets can be dispensed to the player. However, typically, the prize is the object picked up by the claw 204. The front panel 214 can also include other features if appropriate.

Game playing area 206 is the area where game action occurs, and includes a prize holding area containing prizes 205, claw device 204, and a claw movement device (see FIG. 3) for moving claw device 204. Claw device 204 and the transport mechanism are described below in greater detail.

Player controls 210 allow a player to manipulate events in the game, and typically include a joystick, buttons, switch, knob, or the like. Game action occurs in playing area 206, where claw device 204 may be controlled and guided by the player, through the transport mechanism, to grasp prizes 205 located in playing area 206. In the described embodiment, a joystick 210 or similar device (knob, two buttons, etc.) can be manipulated by the player to move the selection mechanism in a plane defined by two axes (or additional directions, in alternate embodiments). In alternative embodiments, buttons (not shown) can also be provided to perform various game functions, such as initiation of downward movement of the claw device 204 to the prizes 205, additional directional control of the claw device, number of players in a game, a start button to begin the game, etc. For example, in some embodiments, a slow button (not shown) can be provided and can be pressed by the player to slow down (or stop) the movement of claw device 204 so as to allow the player to more accurately position claw device 204. In addition, a button can be provided for closing the claw to grasp a prize, or the claw may be closed automatically given a particular input or condition. The controls can be used by the player to move the claw and any grasped prize over a dispensing chute (not shown) which leads to dispenser 216 on front panel 214, open the claw to release any prize into the dispensing chute, and return the claw to a starting position for the next game. Alternatively, any of these three functions can be performed automatically by a controller of the system, such as a computer or CPU (see FIG. 2B).

In alternate embodiments, multiple players can simultaneously or alternately play game apparatus 200. For example, a second set of player controls 210 and dispenser 216 can be provided on the opposite side of the game apparatus 200, and a window can be provided on that side to allow the player to view the playing area 206. The players might alternately control the claw movement device in playing area 206; or two claw movement devices can be provided, with each set of player controls 210 controlling one of the devices. The implementation of a mechanical crane-type game for multiple players is disclosed in greater detail in U.S. Pat. No. 4,778,176, incorporated by reference herein.

Prizes 205 can be a variety of types of objects. For example, in the present invention prizes can be smaller in one or more dimensions than the spaces between adjacent fingers when the fingers are closed, and still be securely grasped. By way of further example, prizes can be spherical (e.g., a ball) or similarly shaped, yet still be securely grasped by the claw, as will be described below with reference to FIG. 5A.

Figure 2B:
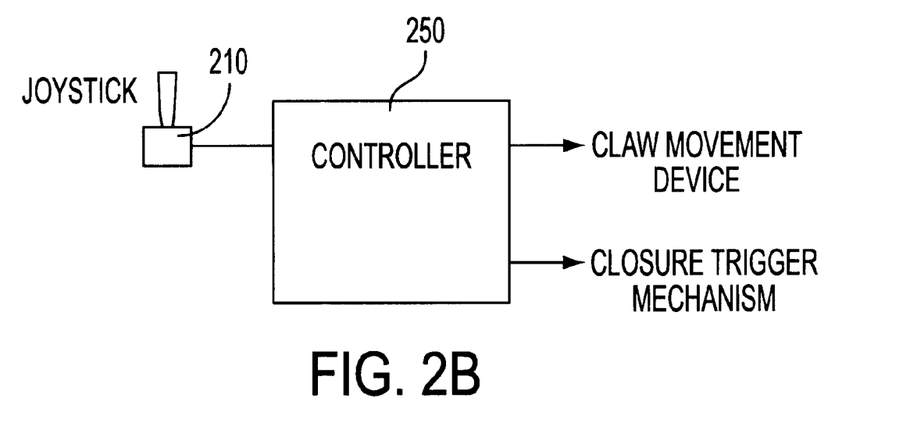
FIG. 2B is a schematic diagram of a control mechanism of a game apparatus in accordance with an embodiment of the present invention.

FIG. 2B is a schematic diagram of a control mechanism incorporated in an embodiment of the present invention. The controller 250 receives inputs from player controls 210 (here depicted as a joystick). Based at least in part on these inputs, controller 250 then sends outputs to claw movement device 38 (see FIG. 3) to control the movement of the claw device relative to the prizes, and the claw closure trigger mechanism (see FIG. 4) to control when the claw opens and closes. Controller 250 is any suitable device for receiving inputs and producing appropriate outputs from those inputs, for example a CPU or computer.

Figure 3:
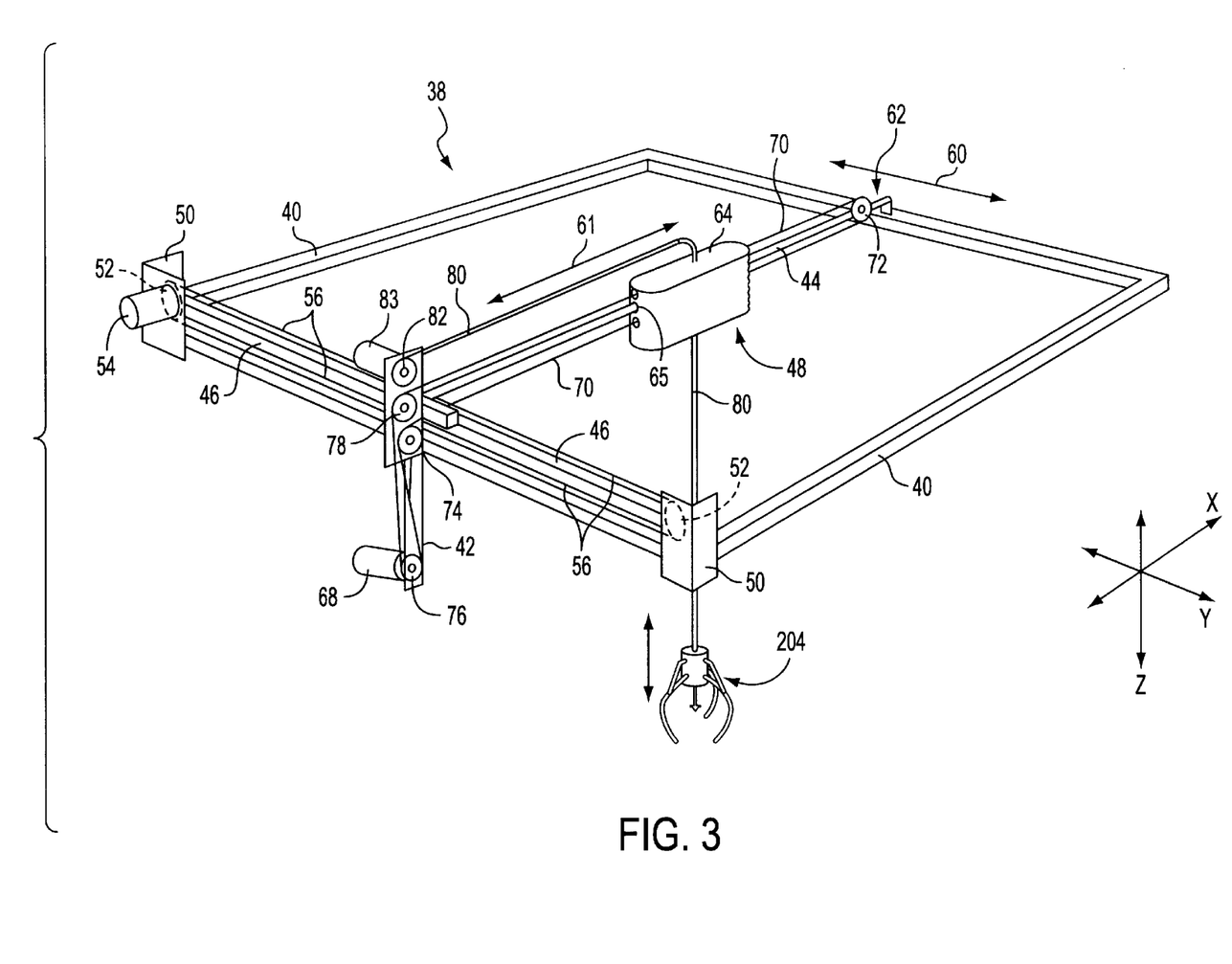
FIG. 3 is a perspective view of a claw device, closure trigger mechanism, and claw movement device provided in the game apparatus of FIG. 2A, in accordance with an embodiment of the present invention.

FIG. 3 is a perspective view of one embodiment of a claw movement device 38 provided in playing area 206 of the game apparatus 200 of the present invention. Claw movement device 38 is preferably provided above prizes as shown in FIG. 2A. In the described embodiment, claw device 204 which is connected to claw movement device 38 may be moved in two degrees of freedom above the prizes and moved in a z-direction toward and away from the prizes, as described below. Alternative mechanisms include a claw movement device that moves in only two directions (e.g., y and z directions), while the prizes rotate on a turntable supported on a floor portion of the prize holding area below. Such a mechanism is described in U.S. Pat. No. 4,778,176, titled "Amusement Apparatus", incorporated herein by reference.

Claw movement device 38 includes an x-movement, y-movement, and z-movement device for respectively moving the claw device in x, y, and z directions. More specifically, claw movement device 38 includes a support frame 40, vertical support 42, x-axis guide rod 44, y-axis guide rod 46, and assembly 48. Support frame 40 may include members coupled to each other in a rectangular configuration for stability, as shown. Frame 40 can be securely coupled to the game housing 202 of the game apparatus 200. In the described embodiment, y-axis guide rod 46 is coupled between two support plates 50 mounted on frame 40 and extends parallel to one of the members of the support frame 40. A pulley 52 is rotatably coupled to Y-axis guide rod 46 and to support plates 50 at each end. A motor 54 (y-motor) has a rotatable shaft that is rigidly coupled to one of the pulleys 52 to drive that pulley.

Vertical support 42 is a floating support that moves along a y-axis along y-axis guide rod 46. A line 56 is coupled to vertical support 42 and is routed around one pulley 52, back through an aperture in vertical support 42, around the other pulley 52, and is coupled to vertical support 42 at the other end of the line. Thus, motor 54 rotates a pulley 52, which causes line 56 to move, causing vertical support 42 to move along y-axis guide rod 46 in a desired y-direction as shown by arrow 60.

X-axis guide rod 44 is coupled to vertical support 42 and moves along the y-axis in conjunction with vertical support 42, as shown by arrow 60. End 62 of guide rod 44 is supported by frame 40 by a sliding member, wheel, or other component that allows the end 62 to move with respect to frame 40. Assembly 48 moves along the length of guide rod 44 in an x-direction of the x-axis as shown by arrow 61.

Assembly 48 includes a carriage 64 and supports claw device 204. Carriage 64 includes a closure trigger mechanism (see FIG. 4) and an aperture 65 through which guide rod 44 extends. A motor-driven pulley system for moving the carriage includes a line 70 which causes the assembly 48 to move along rod 44 parallel to the x-axis when the line 70 is moved by the pulley system. Line 70 is coupled to carriage 64 and is routed parallel to guide rod 44, around an end pulley 72 coupled to guide rod 44, back along the length of guide rod 44, through an aperture in carriage 64, around pulley 74 that is coupled to vertical support 42, around motor pulley 76 coupled to a shaft of a motor 68, and back around pulley 78 coupled to vertical support 42, and is coupled to carriage 64 at the other end of line 70. Line 70 is moved by motor 68, which is coupled to vertical support 42 and drives pulley 76 rotatably coupled to support 42. Motor 68 thus rotates pulley 76, which causes line 70 to move carriage 64 along guide rod 44. The player may control the motors and move the carriage along x- and y-axes using a joystick or other control, as described above.

Assembly 48 also supports claw device 204 by a line 80 from carriage 64. Line 80 is preferably a flexible cable, wire, string, or similar cord, or, in alternate embodiments, can be a rigid member or pole (e.g., a collapsible or telescoping rod). Line 80 is routed through the carriage 64 to a roller or spool 82 which is driven by a motor 83 to wind the line onto the roller 82, causing claw device 204 to be raised vertically toward carriage 64 and away from prizes 205. Similarly, the motor may unwind the line 80 from the roller, causing claw device 204 to lower vertically away from carriage 64 and towards prizes 205. Such movement in the z-direction can be controlled by a control mechanism (see FIG. 2B) either from player inputs or automatically in response to a particular state or states of the game elements (e.g., the claw device has been moved twice in the x-direction). Claw device 204 functions to pick up a prize from prizes 205 as described in greater detail below.

Similar x-y movement devices to claw movement device 38 are described in U.S. Pat. No. 4,718,667 and copending application Ser. No. 08/871,852, which are incorporated by reference herein.

In the described embodiment, the prizes preferably lie in place, since claw device 204 can be moved to any point above prizes 205 using the claw movement device 38. In other embodiments, the prizes can be moved (e.g., on a rotating platform or through a mixing type device) to provide additional difficulty to players when playing the game or to allow a simpler claw movement device having less degrees of freedom to be implemented. For example, prizes 205 can be rotated on a turntable at the bottom of playing area 206 about a central axis through the middle of playing area 206. In such an embodiment, claw device 204 need only be moved along a single axis in a single degree of freedom (such as the x-axis), since the rotational movement of prizes 205 combined with the linear movement of assembly 48 allows claw device 204 to be positioned above any point of any target prize of prizes 205. When prizes 205 are so moved, the assembly 48 need only be moved in one horizontal axis, e.g., only x-axis movement on guide rod 44 need be provided instead of both x-axis and y-axis movement, thus simplifying the mechanism. In some embodiments, the player may slow, stop, or otherwise influence the rotation or other movement of the prizes 205 using a player button or other control during a game.

Figure 4:
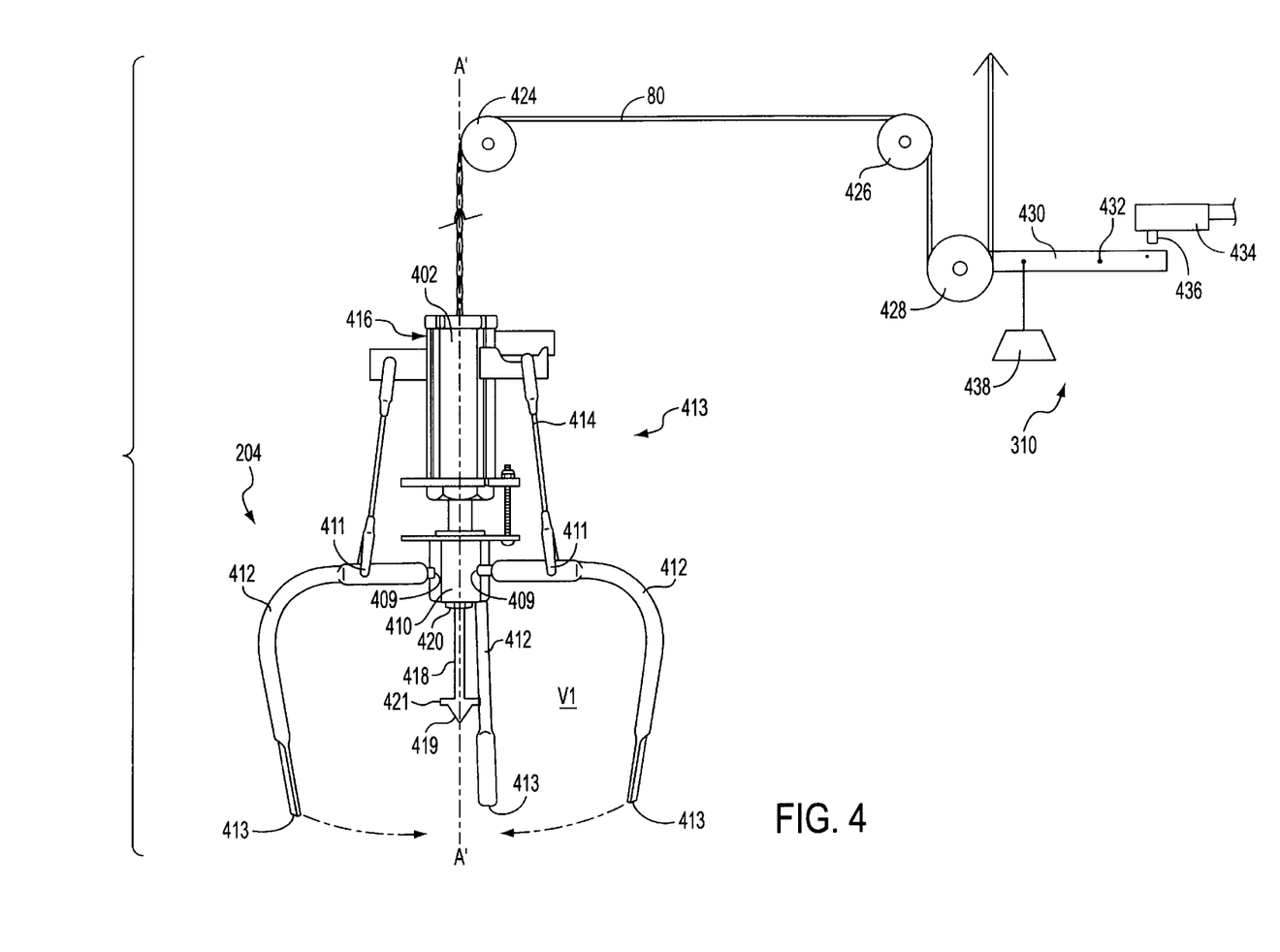
FIG. 4 illustrates the claw device and the closure trigger mechanism of FIG. 3 in further detail, in accordance with an embodiment of the present invention.

FIG. 4 illustrates claw device 204 in greater detail and in conjunction with closure trigger mechanism 310. Claw device 204 comprises three prongs or fingers 412, a claw actuating mechanism 413 for controlling opening and closing of fingers 412, and a gauge 418. While three fingers are depicted in FIG. 4, an alternative embodiment can instead incorporate two fingers. Also, as can be appreciated by those skilled in the art, more than three fingers can alternatively be used. Fingers 412 are each pivotally mounted at their upper ends at a point 409 on a solenoid operated plunger 410 which is controlled by an electric solenoid (not shown) within a housing (forming the body of the claw device) 402. Suitable electrical solenoids can be purchased from Guardian Electronics, for example.

The solenoid is electrically controlled by a game controller (see FIG. 2B) through an electrical wire (not shown) extending along side or within line 80. Each finger is pivotally connected at an intermediate point 411 along its length to a respective lever arm 414 pivotally mounted at its opposite end on the upper end 416 of housing 402. Thus, retraction of plunger 410 into housing 402 on actuation of the solenoid will cause fingers 412 to pivot inwardly about points 409 and 411 into the closed position shown in FIG.

Figure 5A:
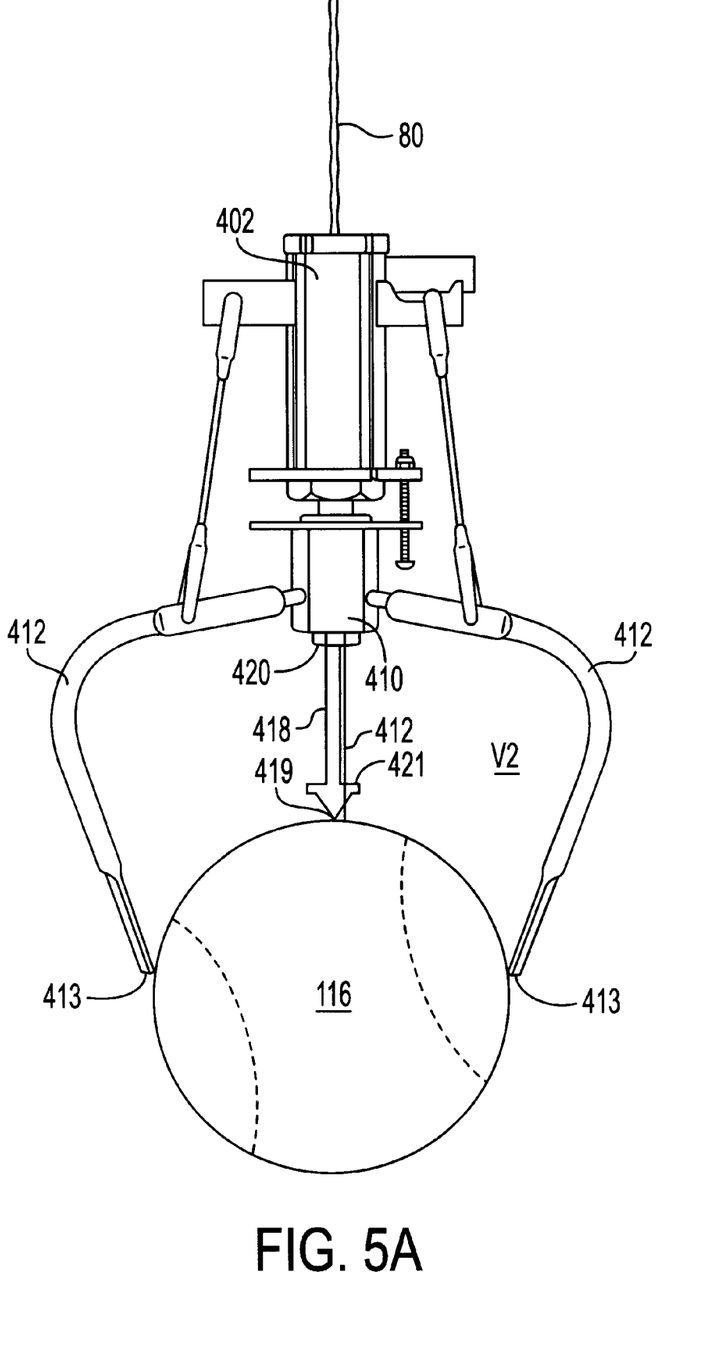
FIG. 5A shows the claw device of FIG. 4 in a closed configuration around a prize, in accordance with an embodiment of the present invention.

5A. Subsequent deactivation of the solenoid and release of plunger 410 will cause the plunger 410 to drop under the action of gravity into the extended position shown in FIG. 4 and cause the prongs to pivot in the opposite direction into the open position shown in FIG. 4.

Fingers 412 can be curved as shown in FIG. 4 (here curved concavely relative to centerline A–A'), but also can be otherwise suitably shaped to grasp a prize. For example, fingers 412 alternatively could have two straight elements angled relative to each other. The arrangement of fingers 412 define a volume between and within fingers 412, volume V having a different shape and size depending upon the form, size and placement of fingers 412. Additionally, the volume between fingers 412 varies during operation, with a volume V1 when fingers 412 are in an open position as shown in FIG. 4, and a volume V2 when fingers 412 are in a closed position such as shown in FIG. 5A.

Closure trigger mechanism 310 is housed within carriage 64 (shown in FIG. 3) and includes pulleys 424, 426 and 428, a pivot arm 430, a weight 438, a switch 434, and electrical connection (not shown) between switch 434 and the solenoid within housing 402. Closure trigger mechanism 310 further acts in conjunction with line 80 which is routed around pulleys 424, 426 and 428. In the described embodiment, the plunger 410 is moved when the solenoid (not shown) is activated by electric signal through the electric wire (not shown) to the game controller (see FIG. 2B) when switch 434 is activated by pivot arm 430 at contact point 436. Pivot arm 430 is rotatably mounted to a support, for example the carriage 64, at pivot point 432. Weight 438 operates on pivot arm 430 to impart a counterclockwise moment about pivot point 432. While claw device 204 is suspended above prizes 205, the weight of claw device 204 operates through line 80 and pulleys 424, 426 and 428 to impart a clockwise moment about pivot point 432. The mass of weight 438 and the distances between pivot point 432 and weight 438 and between pivot point 432 and pulley 428 are selected such that pivot arm 430 does not contact switch 434 at contact point 436 while claw device 204 is suspended above prizes 205. When claw device 204 is lowered onto prizes 205 during the game and line 80 goes slack, the clockwise moment about pivot point 432 is removed. Accordingly, the counterclockwise moment about pivot point 432 that is created by weight 438 causes pivot arm 430 to swivel about pivot point 432, contacting switch 434 at contact point 436. Upon the contact, switch 434 is activated, in turn activates electric coil 420, which in turn activates the solenoid to move plunger 410 and thereby close fingers 412. A change in state of switch 434 caused by the contact at contact point 436 is detected by a controller, such as a computer, connected to switch 434.

The described mechanism for closing the claw device is only one of many possible embodiments. For example, an optical switch, other types of weight detectors or detectors of slack in the line from which the claw device is suspended can be used to initiate closing the fingers of the claw device together. Alternatively, an optical sensor can be used to detect when the claw device engages a prize, at which time the solenoid is activated. Further, other adequate mechanisms known to those skilled in the art, other than a solenoid activated system, alternatively can be used to close the claw fingers.

Gauge 418 of the present invention serves as a spacer of the prize relative to the claw device, which, more specifically, facilitates positioning of a prize relative to the fingers and finger tips, such that the prize is grasped by the finger tips. In the embodiment depicted in FIG. 4, gauge 418 is a member coupled to plunger 410 and extends between fingers 412 substantially along centerline A–A'. The operation of gauge 418 is better understood with reference to FIG. 5A. FIG. 5A is a side view of claw device 204 in the closed position with fingers 412 grasping a ball-shaped prize 116. When prize 116 is properly held, the gauge tip 419 engages prize 116, preventing further movement of prize 116 toward plunger 410, and concomitantly preventing fingers 412 from moving further down around prize 116. Depending upon the relative prize and claw device dimensions, in some cases the finger tips 413 engage sides of prize 116, thereby securely grasping prize 116. Thus, in such cases, due to the presence of gauge 418, fingers 412 generally cannot close around prize 116 completely, and thus there is reduced opportunity for prize 116 to fall out of the space between adjacent closed fingers 412. As such, gauge 418 operates to space the grasped prize to a position relative to the finger tips, where it may be securely held by fingers 412. Also, in cases where the fingers 412 close around the prize 116, when the gauge 418 engages the prize 116 the gauge 418 imparts a pressure on the prize 116 to press the prize 116 against the fingers 412, thus stabilizing the prize 116 relative to the claw device. With this feature, prizes may be grasped and held with greater certainty and regularity, allowing the player to use skill in placing the claw over a desired prize. The game's objectives may therefore be achieved based on a player's skill rather than the unpredictability and reduced probability of a prior art mechanism being able to grasp all of the types of prizes available in the game.

The length of gauge 418 is determined by the size and types of prizes desired to be provided in game apparatus 200. In addition, the length of gauge 418 is also chosen relative to the configuration of the fingers themselves and the orientation of the gauge with respect to the fingers. The gauge is sized and located relative to the fingers such that when the tip of the gauge is contacting a prize to be grasped, and the fingers are closed, the finger tips grasp the prize, such as shown in FIG. 5A. Thus, for a given claw configuration (i.e., finger configuration and gauge placement relative to the fingers), the larger the prize size, the shorter the length of gauge 418 needed to allow fingers 412 to grasp the prize. For example, for prizes having a substantially spherical shape with a diameter of approximately two (2) inches, a gauge which has a length such that it extends to within approximately half of an inch of the finger tips when the fingers are closed, would work well. Thus, in a claw device such as that depicted in FIG. 4, a gauge having a length of approximately two inches would work well with fingers whose tips, when the fingers are closed, extend two and one half inches below the plunger.

Gauge 418 can be formed of any suitable material which would allow the gauge to maintain the spacing of the prize relative to the fingers. More specifically, a material that would experience substantially no flexion when the gauge is under compression between the claw device (when line 80 is slack) and a prize that is lying on a floor portion of the prize holding area and engaged by the gauge tip. For example, steel would work well, as would any suitable metal of similar strength. Also, plastic or hard rubber with sufficient compression and other relevant strength characteristics could be used.

Figure 5B:
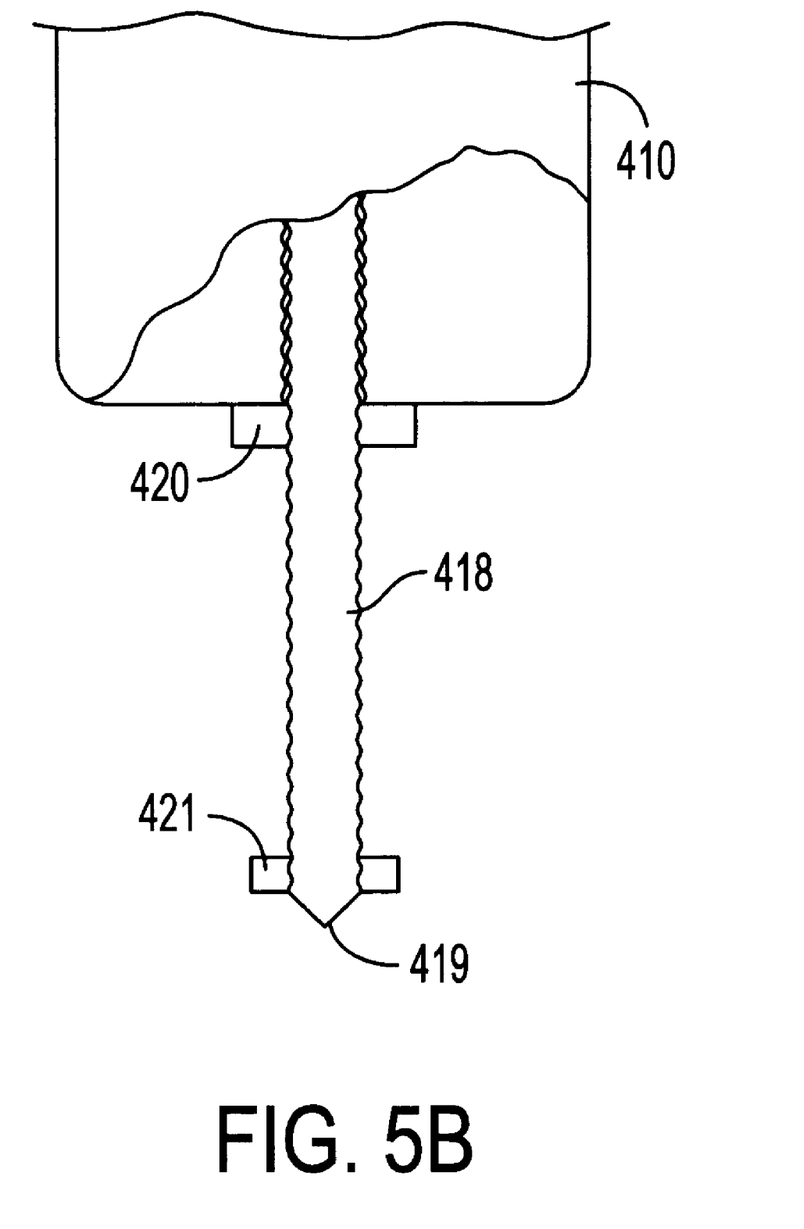
FIG. 5B is a cross-sectional view of the gauge of the claw device depicted in FIG. 4, in accordance with an embodiment of the present invention

As seen in FIG. 5B, gauge 418 is threaded and the distance between plunger 410 and gauge tip 419 can be varied as desired by the operator of the game apparatus 200, by rotating gauge 418 similarly to a screw. Also, a lock nut 420 or other suitable mechanism may be provided to lock the orientation of such a configured gauge 418 relative to the plunger 410. Alternatively, gauge 418 can have a surface that is not threaded and can be held in place relative to the plunger by a screw or other similar connector such that the distance between plunger 410 and gauge tip 419 can be varied. As a further alternative, the distance between plunger 410 and gauge tip 419 can be fixed during manufacturing of the claw device 204.

Figure 6A:
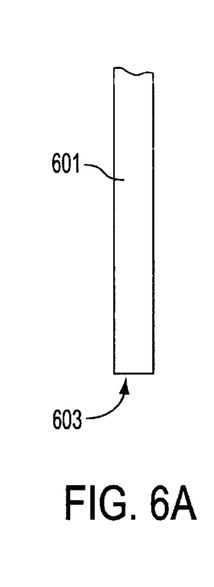
FIGS. 6A–6G illustrate various alternative configurations of the gauge tip of the claw device depicted in FIG. 4, in accordance with alternate embodiments of the present invention.

In the present invention, the gauge advantageously positions a prize relative to the fingers and finger tips. This positioning can be further facilitated by the form of the gauge tip 419 if the gauge tip enhances the ability of the gauge to limit the movement of the prize relative to the fingers, thereby further facilitating the grasping of the prize by the fingers. Gauge tip 419 can take various forms as shown by the cross-sectional views of alternative gauge tips illustrated in FIG. 6. For example, the gauge can have a tip 603, shown in FIG. 6A, which has a substantially flat surface.

Figure 6B:
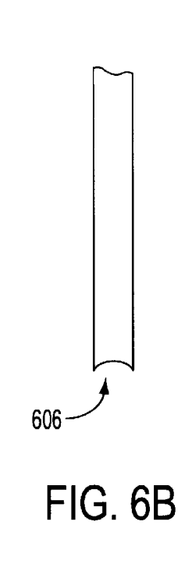
Figure 6C:
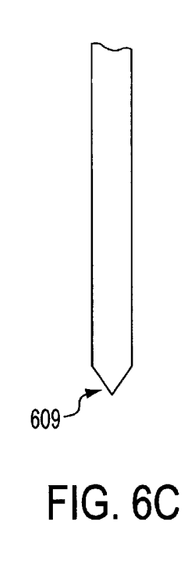

Instead of a flat surface, a gauge tip 606 having a curved surface, such as shown in FIG. 6B, or a pointed gauge tip 609, as shown in FIG. 6C, can be used. The configurations of both tip 606 and tip 609 can better position certain prizes for grasping by the fingers. For example, the concavely curved surface of tip 606 could better hold in place a prize having a convexly curved surface, by better conforming to the surface. Additionally, such a tip could also better hold in place such a prize which also has a hard smooth surface (such as an eggshell container) which might otherwise slip along a flat or pointed gauge tip surface. On the other hand, a pointed tip can better hold in place a prize having a pliable surface (such as a stuffed animal), by easily pressing into the prize surface.

Figure 6D:
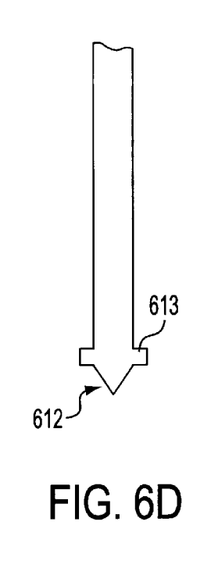
Figure 6E:
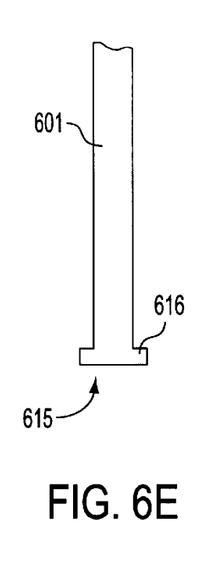
Figure 6F:
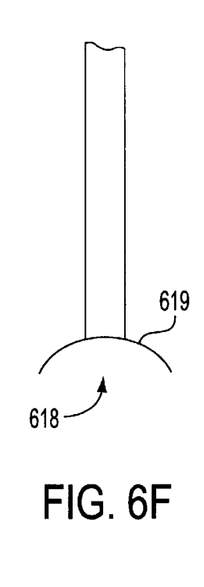
Figure 6G:
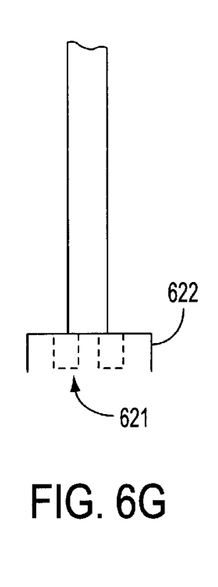

Alternatively, as shown in FIG. 6D, a tip 612 with a flange 613 radially extending around a pointed portion would further advantageously restrict the amount to which the point presses into a prize surface, to avoid damage to the prize from the point. A flange also advantageously increases the area of the gauge tip that can engage a prize. The larger the gauge tip area that is substantially parallel to the prize surface, the better the gauge tip can impede the movement of the prize relative to the claw device, and thereby better facilitate grasping the prize. FIGS. 6E–6G show three examples of gauge tips with increased areas. Gauge tip 615 of FIG. 6E has a flat surface 616 which radially extends beyond gauge body 601. This surface can be of any shape, for example rectangular. While this surface extends in all directions beyond gauge body 601, a tip could also be formed with discrete extensions radiating in particular directions from gauge body 601. A surface forming the gauge tip alternatively can be thinner or more curved as shown by tip 618 in FIG. 6F. A curved surface 619 has the same advantage over a flat surface as discussed above with reference to FIG. 6B. Also, a cup-shaped element would have similar advantages.

In addition to a single surface, the tip can include discrete curved elements that radially extend from the gauge body 601, or discrete angled elements as illustrated by tip 621 in FIG. 6G. The configuration of tip 621 could involve the incorporation of less material than tip 618 of similar diameter, and thus be less expensive. In addition, constructing the discrete elements such that they can move somewhat relative to each other, may further facilitate holding a prize in place by better conforming to the surface of a prize that is engaged by the gauge tip. For each of the above examples and all other suitable gauge tip configurations, it should be understood that the elements of the tip can either be integral portions of the gauge body, or separate elements coupled with the gauge body.

Thus, given a particular type of prizes (e.g., certain shape, size, type of surface) that the operator desires to provide in game 200, the operator can use a claw device having the corresponding particularly suited gauge tip. Additionally, claw device 204 can be constructed to interchangeably receive gauges of various lengths or forms, to allow for the use of the gauge length and tip design that is best suited for the types of prizes desired to be provided in game apparatus 200.

Although the gauge has been described and depicted as having a form similar to an elongated post, the gauge can take any suitable form that facilitates the appropriate spacing of a prize relative to the fingers and finger tips, as described above. For example, the gauge could take the form of a cone, hollow or solid, extending from the plunger with the point of the cone forming the tip of the gauge to engage the prize. The gauge can also take the form of one or more sheets of material extending from the plunger with one end free and forming the gauge tip. On the other hand, such a sheet could also be used with both ends attached to the plunger, with an intermediate point of the sheet extending below the plunger to form the tip that engages a prize during operation. Further, although the gauge has been described as being attached to the plunger, the gauge can be attached to any suitable portion of the claw device to provide the above described spacing.

Figure 7:
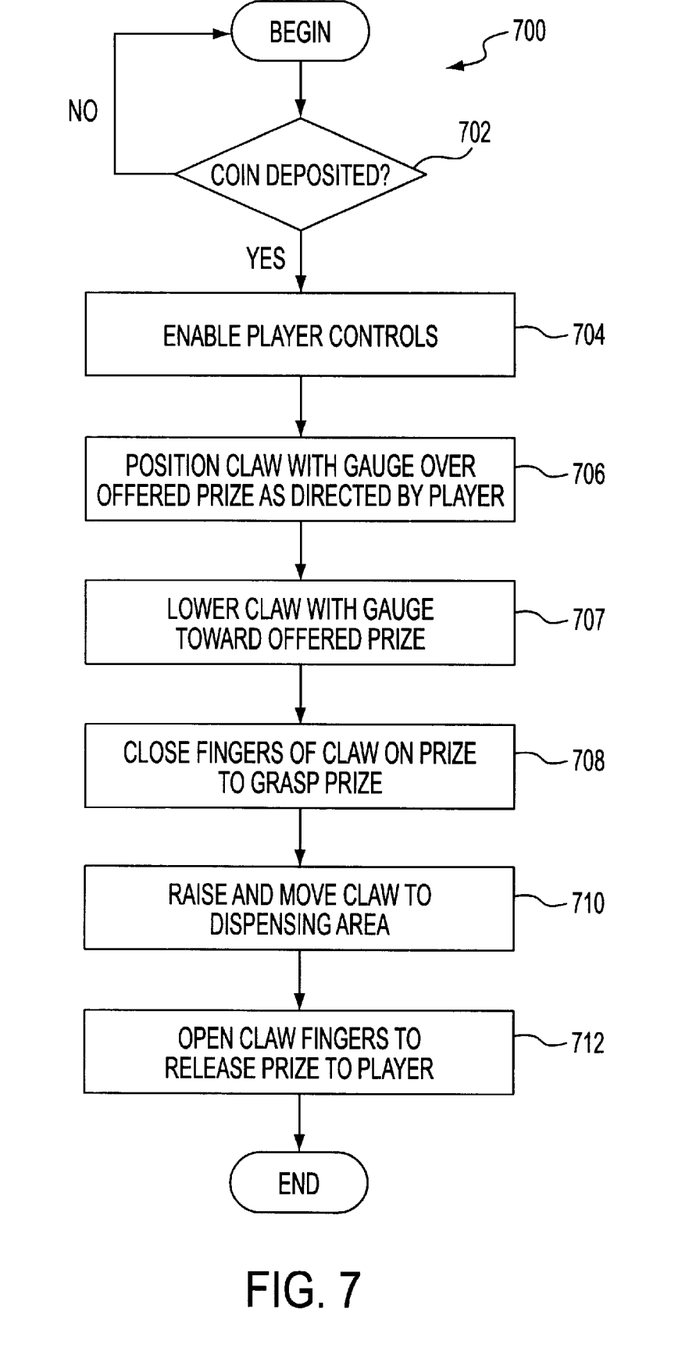
FIG. 7 is a flow chart of a method for playing a claw device game, in accordance with an embodiment of the present invention.

Another aspect of the present invention, shown in FIG. 7, is a method 700 of providing a game for a player to pick up and receive an offered prize. In an operation 702 it is detected whether a coin has been deposited in the game. Although deposit of a coin is determined in the described embodiment, any sufficient monetary token can be used instead of a coin. If no coin has been deposited, the method returns to the beginning, while the method continues to an operation 704 if a coin has been deposited. In an operation 704, player controls are enabled, after which a claw with a gauge is positioned, in an operation 706, over an offered prize as directed by the player through the player controls. In addition to the player, the claw can also be directed according to a controller (shown in FIG. 2B), such as a computer. After the claw is positioned, or after a particular condition is met (e.g., after the game has been activated for a particular amount of time), the claw is lowered toward the prizes in an operation 707. Then fingers of the claw are closed to grasp the prize in an operation 708. The fingers may be closed by any suitable method known to those skilled in the art, and, for example, may be initiated automatically given a particular state of the claw, by a controller such as a computer, or by the player through one of the player controls. Once the fingers are closed, the claw may or may not grasp a prize. If the fingers grasp the prize, the claw is moved to a dispensing area in an operation 710, the claw fingers are opened and the prize is released to the player in an operation 712. Here, the fingers can be opened, for example, automatically in response to the position of the claw, by a controller, or by the player. Although this embodiment of the present invention is described for a single player, the method alternatively can provide a game for several players, with the method described above being performed for each player.

While this invention has been described in terms of several embodiments, it is contemplated that alterations, modifications and permutations thereof will become apparent to those skilled in the art upon a reading of the specification and study of the drawings. For example, a large variety of different gauge forms and claw device configurations can be used to provide different skill levels with different types of prizes. Also, a variety of mechanisms can be used to position the device over a location of a target prize, to lower the claw device toward the prizes, and to provide an award to the player.

It is therefore intended that the following claims include all such alterations, modifications and permutations as fall within the spirit and scope of the present invention.

What is claimed is:

1. A pick-up device comprising:

an actuating mechanism;

a plurality of fingers pivotally supported by said actuating mechanism such that said fingers can be moved between an open and closed position when said actuating mechanism is moved between a first and second position; and a gauge having a first portion adjustably coupled to said actuating mechanism and a second portion that is located within a volume defined by said fingers, said gauge being adjustable to vary the distance which said gauge extends from said actuating mechanism independently from said plurality of fingers.

2. The device of claim 1 wherein said actuating mechanism has a centerline about which said fingers extend, and along which said gauge extends.

3. The device of claim 2 wherein said plurality of fingers is three fingers.

4. The device of claim 1 wherein said plurality of fingers are each pivotable about a first end such that a second end of each finger can move toward the second end of each other finger thereby reducing a distance between the second ends of each finger and reducing said volume defined by said fingers.

5. The device of claim 4 wherein said fingers are curved concavely relative to a centerline about which said fingers extend.

6. The device of claim 1 wherein a tip of said gauge is pointed.

7. The device of claim 1, wherein said gauge includes threading, said threading allowing said distance to be varied.

8. A pick-up device comprising:

an actuating mechanism;

a plurality of fingers pivotally supported by said actuating mechanism such that said fingers can be moved between an open and closed position when said actuating mechanism is moved between a first and second position; and a gauge having a first portion coupled to said actuating mechanism and a second portion that is located within a volume defined by said fingers, wherein a tip of said gauge is concavely curved.

9. A pick-up device comprising:

an actuating mechanism;

a plurality of fingers pivotally supported by said actuating mechanism such that said fingers can be moved between an open and closed position when said actuating mechanism is moved between a first and second position; and a gauge having a first portion coupled to said actuating mechanism and a second portion that is located within a volume defined by said fingers, wherein said actuating mechanism has a centerline about which said fingers extend, and along which said gauge extends, and wherein a tip of said gauge includes a flange extending from said gauge at a particular angle relative to said centerline.

10. A pick-up device comprising:

a claw device having:
  a plurality of fingers which define a volume between said fingers;
  a gauge having a portion located in said volume between said fingers; and
  a claw actuating mechanism comprising:
    a plunger to which said fingers are coupled at a first end of said fingers;
    a housing slideably coupled with said plunger, said housing including a solenoid, said housing, solenoid and plunger configured such that when said solenoid is activated, said plunger moves toward said housing; and
    a plurality of lever arms, a first end of each of said lever arms being connected to an intermediate point along a corresponding finger, said lever arms being pivotally mounted at a second end to said housing, such that when said plunger moves into said housing, said fingers pivot inwardly about said first ends of said fingers; and
a movement device for moving said claw.

11. The device of claim 10, wherein said movement device further comprises:

an x-movement device for moving said claw in a first direction in a plane overlying said object;

a y-movement device for moving said claw in a second direction in said plane overlying said object; and a z-movement device for moving said claw in a direction substantially perpendicular to said first and second directions.

12. The device of claim 11, wherein said z-movement device is automatically controlled.

13. The device of claim 11, wherein said z-movement device is controlled by a user.

14. The device of claim 10, wherein said solenoid can be activated, at least in part, by an input of a user.

15. The device of claim 10, wherein said solenoid can be activated automatically by a controller.

16. The device of claim 10, wherein said solenoid can be automatically activated, based, at least in part, upon when said claw device engages said object.

17. A game apparatus offering a plurality of prizes for a player to pick up during a game, said game apparatus comprising:

a game housing;

a playing area within said housing, said playing area having a prize holding area including said prizes;

a pick-up device disposed substantially above said prize holding area and operative to pick up one of said prizes, said pick-up device comprising a claw having a plurality of fingers which define a volume between said plurality of fingers, and a gauge having a portion located within said volume between said plurality of fingers; and a control device coupled to said pick-up device to facilitate control of said pick-up device.

18. The game apparatus of claim 17, further comprising:

a coin deposit slot on said housing for receiving monetary input to initiate said game.

19. The game apparatus of claim 17, further comprising:

a dispenser located on said housing for providing said player access to a prize picked up by said pick-up device.

20. The game apparatus of claim 17, further comprising:

a claw movement device coupled to said pick-up device, said claw movement device facilitating movement of said claw above said prize holding area, in response to said control device.

21. The game apparatus of claim 20, wherein said control device is manipulatable by said player to facilitate player control of the movement of said claw.

22. The game apparatus of claim 20, wherein, when said fingers are closed on one of said plurality of prizes and a tip located on said portion of said gauge engages said one of said plurality of prizes, an end of at least two of said fingers engages said one of said plurality of prizes, said at least two of said fingers thereby grasping said one of said plurality of prizes such that said one of said plurality of prizes substantially cannot fall between adjacent ones of said fingers.

23. A method for providing a game for a player to pick up and receive an offered prize, said method comprising:

providing a claw having a plurality of fingers which define a volume between said plurality of fingers, and a gauge having a portion located within said volume between said plurality of fingers;

positioning said claw substantially over said offered prize;

lowering said claw;

closing said fingers on said offered prize to grasp said offered prize in said claw while engaging said portion of said gauge with said offered prize;

raising said claw and said offered prize; and opening said fingers to release said offered prize for dispensing of said offered prize to said player.

24. The method of claim 23, wherein when engaging said gauge with said offered prize, said gauge limits movement of said offered prize relative to said fingers and positions said prize relative to said fingers such that said offered prize is contacted by an end of each of said fingers when said fingers are closed.

25. The method of claim 23, wherein said closing of said fingers includes engaging said offered prize with ends of said fingers such that said ends of said fingers grasp said offered prize.

26. The method of claim 23, further comprising:

moving said claw and said offered prize from a first position to a second position, said moving being performed after said raising of said claw and before said opening of said fingers.

\* \* \* \* \*